March 24, 1931.       A. E. FREEMAN       1,797,337
CONNECTING PIN

Filed Dec. 29, 1928

INVENTOR
A.E.Freeman
BY
ATTORNEY

Patented Mar. 24, 1931

1,797,337

UNITED STATES PATENT OFFICE

ALBERT E. FREEMAN, OF EAST ORANGE, NEW JERSEY, ASSIGNOR TO AMERICAN TELEPHONE AND TELEGRAPH COMPANY, A CORPORATION OF NEW YORK

CONNECTING PIN

Application filed December 29, 1928. Serial No. 329,213.

This invention relates to pins, and more particularly to connecting pins adapted to be inserted through coinciding openings in mechanical elements, such as telescopic members, to maintain them in joined relation.

In the connection of mechanical elements, for instance telescopic members of pole derricks or the like, it is customary to adjust the members to a desired length, and then insert a bolt through coinciding openings in the members to maintain them in fixed relation. After the bolt is in place, a nut is applied to the extended threaded end of the bolt in a well-known manner. If the openings in the members do not exactly agree in alignment, difficulty is experienced in inserting the bolt therethrough, and after the bolt is in position, an additional operation of applying a nut to its extended threaded end is required.

Accordingly, it is one of the objects of this invention to provide a connecting pin for members of the character referred to which may be readily attached to and detached from such members.

Another object consists in the provision of locking mechanism for such pin through the medium of which the pin is prevented from becoming accidentally displaced after it is in position.

A further object consists in the provision of a connecting pin which is rugged, simple and comparatively inexpensive.

These and further objects will be apparent from the following description, when considered in connection with the accompanying drawing, in which one embodiment of the invention is illustrated.

Figure 1:
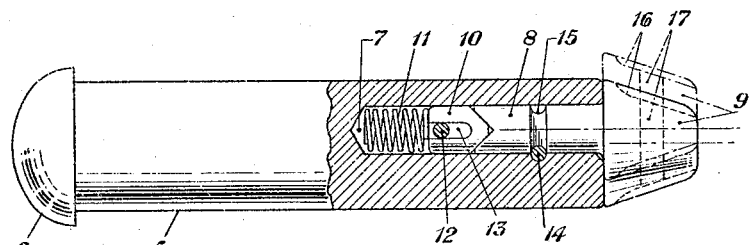
Figure 2:
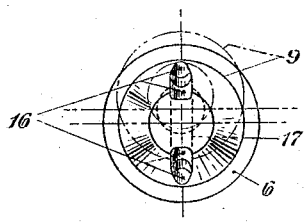
Figure 3:
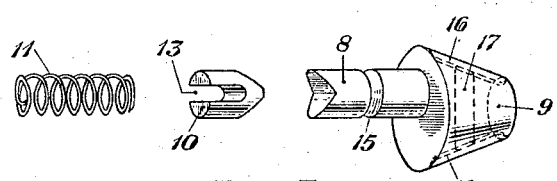

Referring to the drawing, Figure 1 is a side elevation, partly in section, of the improved pin; Fig. 2 is a right end view thereof, and Fig. 3 is an exploded view of the locking mechanism for the pin.

The improved connecting pin which may be composed of suitable metal, such as steel or the like, consists of a cylindrical shank 5 which is provided with a semi-spherical head 6. A circular aperture 7 extends from one end of the shank 5 into the approximate center thereof and lies eccentric to the longitudinal axis of the shank.

The connecting pin is provided with locking mechanism which is positioned within the aperture 7 and at one end of the shank 5. This locking mechanism comprises a cylindrical shank 8 having an integral head portion 9 which lies contiguous the end of the pin. The head 9 is of substantially frusto-conical shape being somewhat blunt at its outer end and having tapered side portions which connect with its circular inner end. The head 9 is positioned in eccentric relation with respect to the shank 8 of the locking mechanism, and its inner circular face is practically the same diameter as that of the shank 5 of the connecting pin. The head 9 is adapted to be rotated, and is shown in full lines in Figs. 1 and 2 in its normal position in alignment with the shank 5, while as shown in dotted lines in these figures it is in its operated locked position and lies in eccentric relation to the shank 5. A V-shaped slot is provided at the end of the cylindrical shank 8, and a similarly shaped point is provided on a detent 10 which registers in said slot. The point on the detent 10 is preferably dull to prevent excess friction between the detent and shank 8 during the rotation of the latter member to be presently described.

A spiral spring 11, positioned at the inner end of the aperture 7, engages an end of the detent 10 and maintains constant pressure thereon. The detent is prevented from rotating by means of a pin 12 which passes transversely through the improved connecting pin and through a slot 13 provided between bifurcated portions of the detent 10. A second pin 14 also passes transversely through the improved device and is seated in a circumferential groove 15 provided in the shank 8. The pin 14 prevents longitudinal movement of the locking mechanism including the spring, detent, shank and head members so that they can not become displaced from the connecting pin. The pin 14, however, permits the rotation of the shank 14 and its head member 9. The tapered side portions may be provided with parallel grooves 16 which serve to form a grip by which the head 9 may be grasped to facilitate its rotation. These grooves may have an aperture 17 extending between them, through which a suitable pin may be inserted to turn the head in case said head may adhere to the shank 5 by reason of rust.

The head member may be readily entered through the openings of the members which it is to connect due to its tapered or frusto-conical shape. The openings do not need to exactly coincide, as the tapered head when inserted through these openings will force them into alignment.

The connecting pin may be forced or hammered into place without injuring its locking mechanism, and it may also be removed by applying hammer blows to the tapered head without injuring the locking mechanism.

The tapered head member which is normally in alignment with the main shank of the pin may be turned 180° in either direction to move it into a locked position. The head in its locked position will lie in eccentric relation to the longitudinal axis of the pin. In this position the improved pin will be prevented from becoming withdrawn from the members which it holds in joined relation. To release the head member from its locked position, it need only be rotated 180° to cause it to assume its normal position. The locking and unlocking of the pin is quickly accomplished without the use of tools. In the rotation of the head from its normal position to its locked position, or vice versa, the shank connected with the head is caused to rotate, and the slot in the shank registers with the point of the detent in either position. The spiral spring which engages the detent causes it to maintain constant pressure on the shank member and its integral head member. It will be apparent that accidental unlocking of the head member is prevented because said head member requires a definite turning force.

The locking mechanism is non-detachable from the improved connecting pin because of the transverse pin which passes therethrough and engages the circumferential groove in the shank of the head member. Accordingly, the parts constituting the locking mechanism can not become lost.

What is claimed is:

1. A connecting pin having a cylindrical member, locking mechanism mounted in eccentric relation to the axis of the cylindrical member, a tapered head member for the locking mechanism rotatably mounted on the cylindrical member, said head member and said cylindrical member having contiguous surfaces of similar cross-section, and means carried by the cylindrical member for preventing longitudinal movement of the locking mechanism and the head member from the cylindrical member.

2. A connecting pin having a cylindrical member, a tapered head member rotatably mounted on the cylindrical member, the contiguous faces of said head member and said cylindrical member being of similar cross-section and constantly engaging each other, said head member in normal position being in alinement with the cylindrical member and in locked position being eccentric thereto, and means carried by the cylindrical member for preventing longitudinal movement of the head member from the cylindrical member.

3. A connecting pin comprising a cylindrical member adapted to be inserted through apertured members to hold them in joined relation, a head member mounted on one end thereof and adapted to be rotated from a normal alined position to the cylindrical member to an eccentric position thereto, said head member in its normal position allowing the entrance of the cylindrical member through the apertured members and in its eccentric position preventing the withdrawal of the cylindrical member therefrom, and means carried by said cylindrical member for preventing longitudinal movement of the head member therefrom.

In testimony whereof, I have signed my name to this specification this 28th day of December, 1928.

ALBERT E. FREEMAN.